(12) United States Patent
Tamai et al.

(10) Patent No.: US 7,267,090 B2
(45) Date of Patent: Sep. 11, 2007

(54) METHOD OF STARTING A HYBRID VEHICLE

(75) Inventors: Goro Tamai, West Bloomfield, MI (US); William L. Aldrich, III, Davisburg, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/285,139

(22) Filed: Nov. 21, 2005

(65) Prior Publication Data

US 2007/0113814 A1  May 24, 2007

(51) Int. Cl.
*F02N 11/06* (2006.01)
*F02N 11/14* (2006.01)

(52) U.S. Cl. .............. 123/179.3; 123/179.4; 290/38 E; 290/40 C

(58) Field of Classification Search ............ 123/179.3, 123/179.4; 290/50, 38 E, 40 C
See application file for complete search history.

(56) References Cited

U.S. PATENT DOCUMENTS

| | | | |
|---|---|---|---|
| 6,202,615 B1 * | 3/2001 | Pels et al. ................ | 123/179.3 |
| 6,321,707 B1 * | 11/2001 | Dunn ....................... | 123/179.3 |
| 6,335,574 B1 * | 1/2002 | Ochiai et al. ............. | 290/40 C |
| 6,701,880 B1 * | 3/2004 | Gauthier et al. .......... | 123/179.3 |
| 6,744,146 B2 * | 6/2004 | Fulton et al. ............. | 290/37 A |
| 6,769,389 B2 * | 8/2004 | Tamai et al. ............. | 123/179.3 |
| 6,844,634 B2 * | 1/2005 | Kobayashi et al. ....... | 290/40 C |
| 6,962,135 B2 * | 11/2005 | Kahlon et al. ........... | 123/179.3 |
| 2003/0037748 A1 * | 2/2003 | Kawai et al. ............ | 123/179.4 |
| 2003/0140880 A1 * | 7/2003 | Kahlon et al. ........... | 123/179.3 |

* cited by examiner

*Primary Examiner*—Stephen K. Cronin
*Assistant Examiner*—Arnold Castro

(57) ABSTRACT

A method of performing a first start of an internal combustion engine of a hybrid electro-mechanical vehicle includes activating an auxiliary power module prior to the engine starting to direct power stored in a high voltage battery (used for powering the motor/generator(s) on the hybrid vehicle) through the auxiliary power module at a voltage level of a low voltage battery to assist the low voltage battery in powering a starter motor for starting the internal combustion engine.

10 Claims, 4 Drawing Sheets

METHOD OF STARTING A HYBRID VEHICLE

TECHNICAL FIELD

This invention relates generally to a method of starting a hybrid vehicle, and more specifically to activating an auxiliary power module to assist a low voltage battery in powering a starter motor.

BACKGROUND OF THE INVENTION

Hybrid electric vehicles offer reduced fuel consumption and emissions by utilizing both an electric motor/generator and an internal combustion engine and an onboard electronic control unit (ECU) programmed to vary use of each of the engine and motor/generator during different driving conditions to achieve peak efficiency.

Typical hybrid motor vehicle systems include series hybrid systems and parallel hybrid systems. In a series hybrid system, the internal combustion engine drives a generator which recharges a high voltage battery which in turn powers the electric motor/generator to power the vehicle. In a parallel hybrid system, both the electric motor/generator and the internal combustion engine may provide power to drive the vehicle. Differential gearing may be employed to allow power flow through a purely mechanical path resulting in direct or fixed ratio from the internal combustion engine, or the motor/generators may be employed to provide power to or receive power from the engine through the differential gearing, thus allowing a continuously variable speed ratio between the input and the output of the transmission. Again, the ECU controls power flow from the engine and the electric motor/generators to allow for greatest efficiency under current driving conditions. Parallel hybrids also require a high voltage battery (e.g., a 36 volt battery) that is utilized in certain driving conditions to power the motor/generator when it acts as a motor, to receive power from the motor/generator when it acts as a generator and during regenerative braking. The high voltage battery allows for a "quick start" with sufficient power to launch the vehicle from a temporary stop such as a stop light, when the ECU has to shut off the internal combustion engine for emissions purposes. Thus, hybrid motor vehicles are able to recharge the high voltage battery during driving (i.e., when the motor/generator is acting as a generator) and it generally does not require any offboard battery charging.

Most hybrid vehicles also employ a low voltage battery (e.g., a 12 volt battery) to run typical motor vehicle accessories, such as headlights, an audio system, the ECU and other electronic components. The low voltage battery may also be recharged by the high voltage battery (via an auxiliary power module ("APM"), also referred to as a DCDC converter, that converts power from the high to the low voltage) assuming the APM has been activated (which is only after the engine is running). As used herein, "activating" the APM means causing the APM to begin converting voltage from the high voltage level to a lower voltage level, or vice versa.

Different hybrid motor vehicles may utilize the high and low voltage battery systems differently in performing a first start (also referred to herein as a cold start) of the hybrid motor vehicle. "First start" or "cold start" refers to the motor vehicle being started for the first time after the motor vehicle has been completely shut off for an extended time. This is in contrast to the "quick start" described above. A first start is typically initiated by a vehicle operator inserting a key into the ignition and turning the key to a key-up or further to a key-crank position. In one configuration of a hybrid motor vehicle, the high voltage battery is used to perform the vehicle first start and the low voltage battery is retained for powering vehicle accessories but is not utilized in the first start process. In another configuration, the low voltage battery is utilized in a first start by supplying power to a starter motor to start the internal combustion engine, with the high voltage battery utilized for quick starts but not for first starts. The low voltage battery also powers the motor vehicle accessories after the first start. In yet another electrical system configuration, the starter motor initially turns the internal combustion engine to a first speed during the first start and the motor/generator is then employed in tandem with the starter motor to assist in turning the internal combustion engine to a final start speed as described in U.S. Pat. No. 6,769,389 issued Aug. 3, 2004 to Tamai et al., which is commonly assigned and is hereby incorporated by reference in its entirety.

SUMMARY OF THE INVENTION

In hybrid vehicle systems utilizing the low voltage battery in accomplishing a first start, it is desirable to ensure sufficient charge in the low voltage battery so that an offboard jump start is not required. An "offboard jump start" means that a power source not part of the hybrid vehicle is used to charge the low voltage battery and thereby start the vehicle. Some hybrid motor/generator vehicles employ an APM to convert power at the high voltage level to voltage at the low voltage level. APMs are typically activated only after the engine has started; that is, the ECU does not activate the APM until after it receives a signal that the engine is running. Once activated, the APM may provide power from the high voltage battery to the low voltage battery if the low voltage battery is low, weak or cold and if the high voltage battery capability is acceptable. Additionally, the APM may also be used to ramp bus voltage (voltage of a bus connected between the low voltage battery and the starter/motor as well as other vehicle accessories) from the low voltage level achieved after the engine is turned on to a desired running voltage higher than low voltage level such as 13.9 volts.

A method of performing a first start of an internal combustion engine of a hybrid electro-mechanical vehicle described herein utilizes the APM prior to the engine running to allow an "onboard jump start" by assisting the low voltage battery. Thus, the high voltage battery and the APM are controlled in a novel fashion to ensure engine startability.

The method of performing a first start of an internal combustion engine of a hybrid electro-mechanical vehicle having a motor/generator powerable by a high voltage battery (characterized by a first voltage) as well as a starter motor for starting the internal combustion engine that is powerable by a low voltage battery (characterized by a second voltage less than the first voltage) includes activating the APM prior to the engine running to thereby direct power stored in the high voltage battery through the APM at the second voltage to assist the low voltage battery in powering the starter motor. Within the scope of the invention, there are two alternative ways in which activating the APM to direct power stored in high voltage battery to assist the low voltage battery occurs. First, the activating step may comprise providing the power directed through the APM to the starter motor in parallel with power provided by the low voltage battery. This method of activating the APM may be initiated if the ECU recognizes that a key-crank is being attempted.

Another method of activating the APM includes charging the low voltage battery with the power directed through the APM. The ECU may control the APM to charge the low battery in this manner if key-crank has not been attempted yet or if a key-crank results in a failed start of the engine after the APM has been activated to provide power in parallel with the low voltage battery as described above. The ECU may control the APM to charge the low voltage battery for a predetermined amount of time during key-up or key-off (i.e., key out of ignition) situations, even if a reset of the ECU occurs due to low bus voltage.

As discussed above, the ECU may activate the APM even prior to a failed key-crank. This may occur in conjunction with determining the inadequacy of certain vehicle conditions. For instance, the method may include monitoring any or all of voltage level of the low voltage battery pack, voltage level of the high voltage battery pack, temperature of the low voltage battery pack and temperature of the high voltage battery pack. The method may further include comparing the monitored data to predetermined values. For instance, the ECU may determine whether voltage level in the low voltage battery pack is greater than a predetermined level. If not, then the ECU activates the APM as described above. However, the ECU may also determine whether voltage level on the high voltage battery pack is greater than a predetermined level. If the voltage in the high voltage battery pack is not greater than the predetermined level and the voltage in the low voltage battery pack is not greater than a different predetermined level, then neither battery pack has sufficient charge to allow the onboard assist and an offboard jump start is required. The ECU may also determine whether temperature of a low voltage battery pack is greater than a predetermined temperature and whether temperature of a high voltage battery pack is greater than a predetermined temperature. If either of these determinations is negative, then the ECU activates the APM as described above.

In another aspect of the invention, after a failed key-crank, the ECU may detect a low voltage in the low voltage battery, activate the APM and after sufficient charge is determined in the low voltage battery, the ECU may relay a signal to attempt a key-crank. The signal may be to a body control module which in turn signals the driver that key-crank may be attempted by, for instance, a flashing icon in the driver information console.

Also within the scope of the invention, after a failed key-crank, the driver may cause the ECU to activate the APM by performing a series of known steps such as tapping the brake, shifting into park, etc. The ECU will identify the predetermined steps and then activate the APM.

The method provides greater reliability of engine key-crank starting by utilizing existing components (the high voltage battery, APM and ECU) to assist the low voltage battery in a first start of the engine.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2b is a block diagram illustrating the remaining portion of the method of FIG. 2a;

DESCRIPTION OF THE PREFERRED EMBODIMENTS

Figure 1:
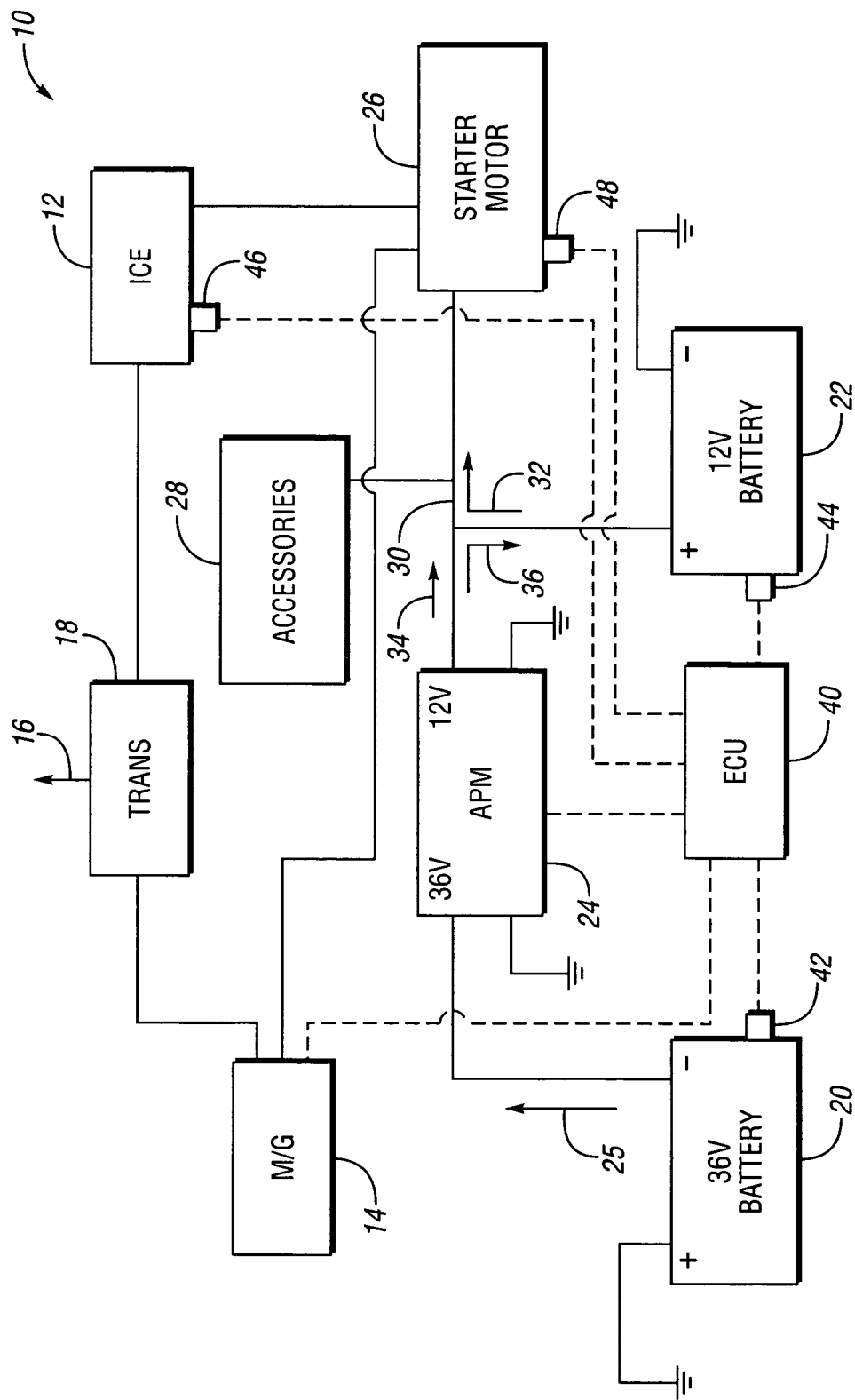
FIG. 1 is a schematic representation of an engine start system including high and low voltage batteries and an auxiliary power module on a hybrid electro-mechanical vehicle.

Referring to FIG. 1, a hybrid electro-mechanical vehicle 10 includes an internal combustion engine 12 as well as a motor/generator 14, both of which may power a transmission output member 16 to power the vehicle wheels (not shown) as will be well understood by those skilled in the art. An additional motor/generator (not shown) may also be employed. The motor/generator 14 and the engine 12 may be connected in different arrangements with the transmission 18 and the output member 16 such as in a series or a parallel arrangement, as described above. The connection of the engine 12, motor/generator 14 and transmission 18 in FIG. 1 is only schematic and is not intended to limit the possible interconnections between these components.

The vehicle 10 includes both a high voltage battery 20 and a low voltage battery 22. The high voltage battery 20 is operatively connected to and may power the motor/generator 14 (when the motor/generator 14 acts as a motor) or receive power therefrom (when the motor/generator 14 acts as a generator). Additionally, the high voltage battery 20 is operatively connected to an auxiliary power module 24. The auxiliary power module 24 (APM) may also be referred to as a DCDC converter and converts power from the high voltage level (i.e., 36 volts) to the low voltage level (i.e., 12 volts). Although these specific voltage levels are indicated in the embodiment of FIG. 1, other voltage levels may be employed within the scope of the invention. Power flow from the high voltage battery 20 to the APM 24 is represented by arrow 25 and may be controlled to a maximum discharge power as will be well understood by those skilled in the art.

The low voltage battery 22 is operatively connected to a starter motor 26 and is utilized to start the starter motor 26, which in turn powers the internal combustion engine 12 in a first start. Other vehicle accessories 28 such an audio system, headlights, power steering, etc., are operatively connected to a 12-volt bus 30 and receive power from the low voltage battery 22. The starter motor 26 is also connected to the bus 30. Power from the low voltage battery 22 to the starter motor 26 is represented by arrow 32.

Under the method described herein, power 25 delivered from the high voltage battery 20 for conversion from a high voltage level to a low voltage level through the APM 24 may be delivered directly to the starter motor 26 (as represented by arrow 34) or may be directed to the low voltage battery 22 as directed by arrow 36. Specifically, the method described below utilizes an ECU 40 to control power flow from the high and low voltage batteries 20, 22, respectively, to provide power to the starter motor 26 for initiating a first start of the internal combustion engine 12. As will be described in more detail below, the APM 24 may be activated to allow power flow 25 from the high voltage battery 20 to the starter motor as shown by arrow 34 in parallel with power flow 32 from the low voltage battery 22 or, alternatively, may direct the power 25 from the high voltage battery 20 directly to the low voltage battery 22, represented by arrow 36, for recharging the low voltage battery 22 under certain conditions.

As indicated in FIG. 1, the ECU 40 is operatively connected (as illustrated by dashed lines representing transfer conductors) to the motor/generator 14, the engine 12, both the batteries 20, 22, the APM 24 and the starter motor 26. To receive data from and control power flow amongst these components as described below. The batteries 20, 22 are operatively connected to sensors 42 and 44, respectively, which may be used to sense certain conditions such as voltage level and/or temperature, which conditions are then relayed to the ECU 40. The internal combustion engine 12 may also be equipped with a sensor 46 to sense certain conditions such as temperature. Finally, the starter motor 26 may be equipped with a sensor 48 to sense conditions such as temperature. Other sensors (not shown) may be located elsewhere on the vehicle 10 and operatively connected to the ECU 40 for providing information thereto. For instance, sensors may be employed in relation to the ignition column on the vehicle 10 to determine whether a vehicle operator has inserted a key into the ignition (key-up) has turned the key (key-crank) or whether no key is present (key-off).

Figure 2A:
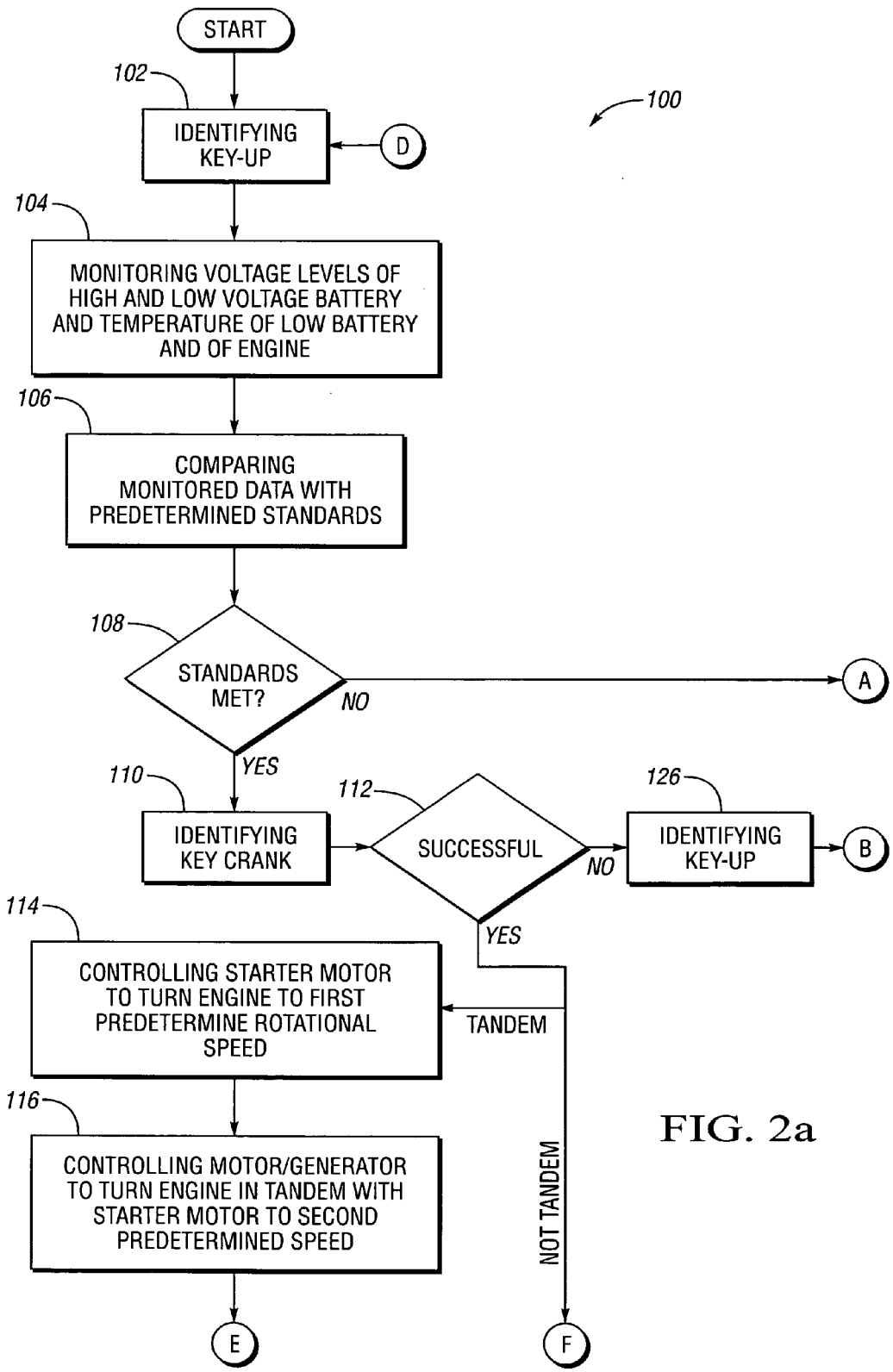
FIG. 2a is a block diagram illustrating a portion of a method of performing a first start of an internal combustion engine according to a preferred embodiment of the present invention.
Figure 2B:
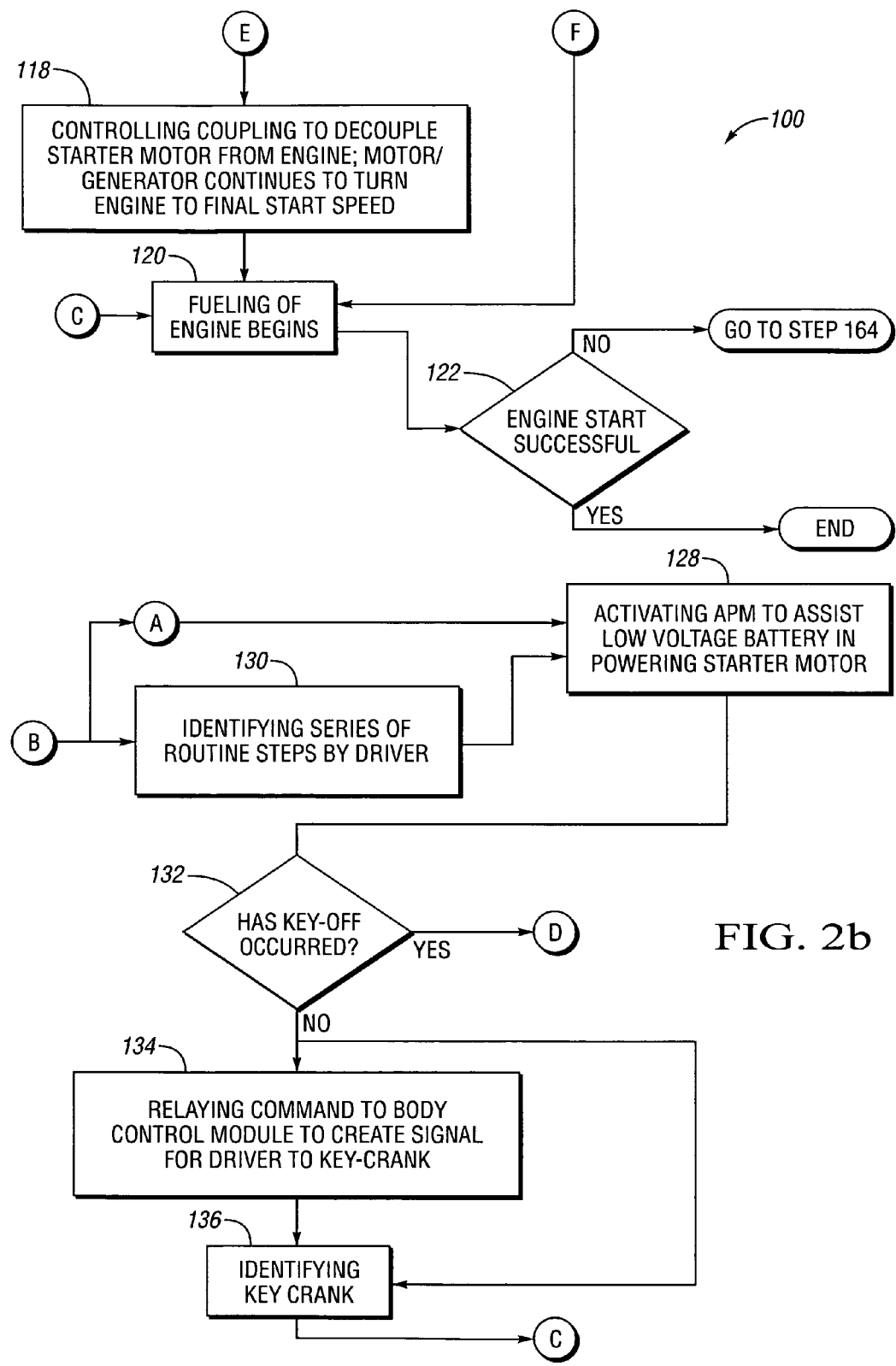

FIGS. 2a and 2b depict a method 100 for performing a first start of the internal combustion engine 12 of the hybrid vehicle 10 of FIG. 1. More precisely, FIGS. 2a and 2b show a series of block diagrams representing steps performed by the ECU 40 (shown in FIG. 1). The steps shown in FIG. 2b interfit with the steps shown in FIG. 2a at the respective points labeled A, B, C and D. The method 100 begins at step 102 in which the ECU 40 identifies that key-up has occurred. Next, in step 104 the ECU 40 monitors voltage levels in the high and low battery packs 20, 22 (using sensors 42 and 44, respectively) and also monitors the temperatures of the low battery pack 22 and the internal combustion engine 12 (utilizing sensors 44 and 46, respectively). After the monitoring step, at step 106 the ECU 40 compares the monitored data with predetermined standards. For example, the ECU 40 compares the monitored high voltage level with a predetermined high voltage level, the monitored low voltage with a predetermined low voltage level and the monitored temperatures with a predetermined temperature or temperatures. These predetermined standards are stored in the ECU 40. After the comparing step 106, the ECU 40 determines in step 108 whether the predetermined standards have been met. Specifically, the ECU 40 determines whether the monitored low voltage level is greater than or equal to the predetermined low voltage level, whether the monitored high voltage level is greater than or equal to the predetermined high voltage level, and whether the monitored temperatures are greater than or equal to the predetermined temperature or temperatures, in which case the standards have been met. If the standards have not been met, then either the high voltage battery 20 or the low voltage battery 22 is characterized by a voltage less than the desired predetermined level and/or the temperature of the engine or of the low voltage battery is less than the desired predetermined minimum temperature.

If the ECU 40 determines in step 108 that the standards have been met, then the low voltage battery pack apparently has a voltage level high enough to attempt key-crank without requiring the APM 24 of FIG. 1 to assist in powering the starter motor 26. Accordingly, the method 100, in that instance, next includes identifying that key-crank has occurred. The ECU 40 then determines whether key-crank has been successful in step 112. If key-crank is successful, i.e., if the key-crank has caused the starter motor 26 to begin turning the engine 12 (see FIG. 1), the engine 12 is then started according to a typical non-tandem start or alternatively according to a tandem start as described in U.S. Pat. No. 6,769,389. If a tandem start is employed, the ECU 40 proceeds according to steps 114, 116 and 118. Under step 114 controls the starter motor to turn the engine to a first predetermined rotational speed. After step 114, the ECU 40 controls the motor/generator 14 to turn the engine 12 in tandem with the starter motor 26 to a second predetermined speed in step 116. After step 116, when the second predetermined speed is achieved, the ECU 40 in step 118 controls a coupling to decouple the starter motor 26 from the engine 12. Once decoupled, the motor/generator 14 continues to turn the engine 12 to a final start speed. When the final start speed is achieved, in step 120 the ECU 40 allows fueling of the engine 12 to begin.

Alternatively, after a successful key-crank in step 112, if the ECU 40 is programmed for a non-tandem start, the method immediately proceeds to step 120 in which the ECU 40 causes fueling of the engine 12 to begin. After step 120 is attempted, after either the tandem or non-tandem method, the ECU 40 determines in step 122 whether fueling of the engine 12 was successful. If fueling was successful, the method 100 is complete. However, if fueling was not successful, the method 100 proceeds to step 164 (described below).

Referring again to step 102, it may be seen from the flow diagram that steps 104, 106 and 108 may be partially or completely bypassed if the ECU 40 identifies key-crank in step 110 prior to completing steps 104, 106 and 108. For instance, if a vehicle operator immediately attempts key-crank after key-up, the method will move from step 102 to step 110 in the flow diagram. Again, under step 112, the ECU will determine whether key-crank was successful. If key-crank is successful, the same tandem or non-tandem steps described above may be accomplished by the ECU 40.

Whether the method 100 utilizes steps 104, 106 and 108 after step 102 or proceeds immediately from step 102 to step 110, if it is determined in step 112 that key-crank was not successful, then, if the ECU 40 identifies key-up in step 126, the method 100 may move either directly to step 128 in which the ECU 40 activates the APM 24 or may first require that the ECU 40 identify a series of routine steps by the driver in step 130 prior to activating the APM 24 in step 128, as illustrated in FIG. 2b. If, however, identifying key-up step 126 does not occur, for instance if the vehicle operator has removed the key from the ignition, the method 110 will be terminated. If the ECU 40 is programmed to require step 130, identification of a series of routine steps by the driver to activate the APM 24, the driver will be required to perform a series of steps (such as shifting the vehicle into park, stepping on the brake, etc.) in a specific predetermined order which will then cause the ECU 40 to activate the APM 24 in step 128. Alternatively, the ECU 40 may be programmed to automatically perform step 128 in which the APM 24 is activated to assist the low voltage battery 22 in powering the starter motor 26 after step 126. Activating the APM step 128 will be described in more detail below with respect to FIG. 4.

After the APM has been activated in step 128, if the ECU 40 determines in step 132 that key-off has occurred, then the method 100 returns to step 102 as indicated by the letter D shown in both FIG. 2a and FIG. 2b, and the ECU 40 will repeat the steps as described above beginning with step 102.

If, however, key-off is not determined in step 132, then the ECU 40 may be programmed to perform an optional step 134 in which the ECU 40 relays a command to a body control module on the vehicle 10 (such as a body control module located in a passenger compartment of the vehicle 10 and operatively connected to the ECU, as will be well understood by those skilled in the art) that signals to the driver that key-crank may be attempted. Alternatively, the ECU 40 may proceed directly to step 136 (shown by the optional arrow leading directly from step 132 to step 136) without relaying a command to the body control module under step 134, in which key-crank is identified and the ECU 40, in step 120, will cause fueling of the engine to begin. If key-crank is not identified (for example if key-off has occurred) step 120 will not be performed.

Figure 3:
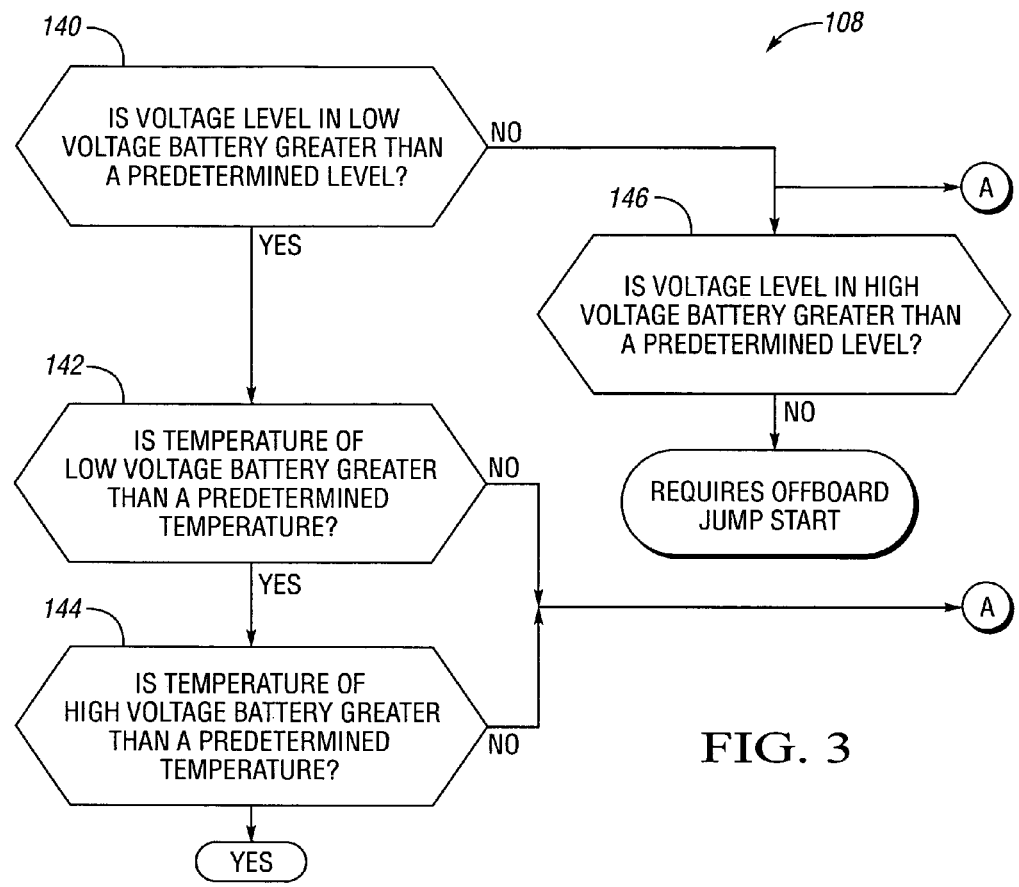
FIG. 3 is a block diagram illustrating in more detail a step of the method of FIGS. 2a and 2b, comparing monitored data with predetermined standards.

Turning now to FIG. 3, step 108 of FIG. 2a, in which the ECU 40 determines whether the predetermined standards of step 106 have been met is shown in more detail. Specifically, step 108 includes step 140 in which the ECU 40 determines whether voltage level in the low voltage battery pack is greater than a predetermined level (i.e., a reference level stored within the ECU 40). If the determination under step 140 is positive, step 108 proceeds to step 142 in which the ECU 40 determines whether the temperature of the low battery pack 22 is greater than a predetermined temperature. If step 142 is positive, step 108 may proceed to step 144 in which the ECU 40 determines whether the temperature of the high voltage battery pack is greater than a predetermined temperature (which may be the same temperature or a different temperature than the predetermined temperature used in step 142). If determinations under steps 140, 142 and 144 are all positive, the method 100 proceeds to step 110 from step 108, as shown in FIG. 2a. If, however, any of steps 140, 142 or 144 are negative, the method 100 may proceed differently. For instance, referring to FIG. 3 again, if the determination in step 140 is negative, step 108 proceeds to an optional step 146 in which the ECU 40 determines whether voltage level in the high voltage battery pack is greater than or equal to a predetermined level. If the determination in the optional step 146 is negative, the voltage levels in both the high voltage battery 20 and the low voltage battery 22 of FIG. 1 are insufficient to allow APM 24 activation to sufficiently assist the low voltage battery 22 in powering the starter motor 26. Accordingly, an offboard jump start is required. If optional step 146 is not performed, for instance if the vehicle does not having a sensor 44 as shown in FIG. 1 to gauge the voltage level of the high voltage battery 22, then the method may proceed from step 140 directly to point A in FIG. 2b. Additionally, if the determination under either of steps 142 or 144 is negative, the method 100 proceeds to point A in FIG. 2b. Preferably, the method 100 performs each of steps 140, 142, 144 and 146. However, in alternative embodiments, only one or more of steps 140, 142 and 144 may be performed and step 146 may or may not be performed.

Figure 4:
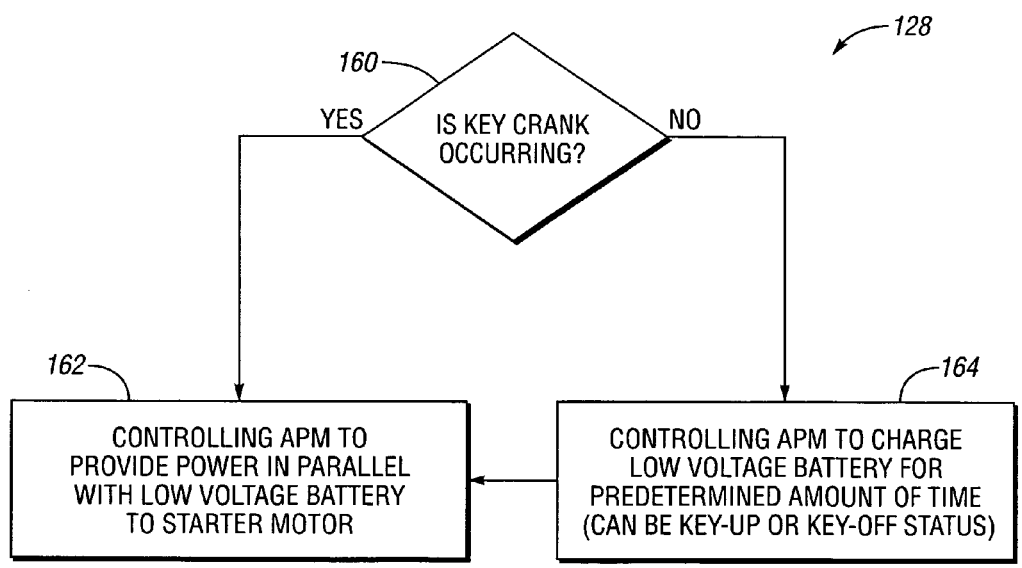
FIG. 4 is a block diagram illustrating in more detail a step of the method of FIGS. 2a and 2b, activating the auxiliary power module.

Referring now to FIG. 4, the activating APM step 128 of FIG. 2b is shown in greater detail. First, the activating step 128 includes a determination in step 160 as to whether key-crank is occurring. This determination of step 160 is a separate from step 110 in which the ECU 40 identifies key-crank. Specifically, the step 160 is a determination as to whether key-crank is occurring after the method 100 has proceeded to step 128. Thus, if the determination of step 160 is positive, key-crank is occurring (i.e., the vehicle operator is attempting key-crank), then the activating step 128 includes step 162 in which the ECU 40 controls the APM 24 to provide power in parallel with the low voltage battery pack 22 to the starter motor 26. Specifically, referring again to FIG. 1, the ECU 40 controls the APM 24 to provide power (identified by arrow 34) in parallel with power provided by the low battery pack 22 (identified by arrow 32) to the starter motor 26.

Alternatively, if the determination under step 160 is negative, that is key-crank is not occurring, then the activating the APM step 128 includes step 164 in which the ECU 40 controls the APM 24 to charge the low voltage battery pack 22 for a predetermined amount of time, such as 30 seconds. Step 164 may occur during key-up or key-off status. Referring again to FIG. 1, step 164 is illustrated by power represented by arrow 36 flowing from the APM 24 to the low voltage battery 22. The arrow in FIG. 4 leading from step 164 to step 162 indicates that if the ECU 40 determines that key-crank is occurring during step 164 (during the time in which the low battery pack is being charged), then the step 164 will be terminated, that is the APM 24 will stop charging the battery 22 with power 36 shown in FIG. 1, and the ECU 40 will alternatively activate the APM 24 according to step 162, so that power is provided as shown by arrow 34 in parallel with the low voltage battery 22 (power shown by 32) to power the starter motor 26.

The steps of the method 100 will now be discussed under specific sample vehicle conditions. In one scenario, if the voltage of the low voltage battery 22 upon key-up is low enough (i.e., it is less than the predetermined voltage level), the method 100 will proceed through steps 102, 104, 106 and 108 of FIG. 2a to step 128 of FIG. 2b and, more specifically, to steps 160 and 164 of FIG. 4 (assuming key-crank is not occurring). Thus, the APM 24 is controlled to charge the low voltage battery 22 for a predetermined amount of time. During key-crank, under steps 160 and 162, the ECU 40 activates APM 24 to provide power in parallel with the low voltage battery 22 to the starter motor 26.

In another scenario, if either the low voltage battery 22 or the engine 12 upon key-up is cold enough (i.e., after the monitoring and comparing steps 104 and 106, respectively), it is determined that the predetermined temperature standards are not met in step 108, then the ECU 40 proceeds to step 128 in which the ECU 40 activates the APM 24 to assist the low voltage battery 22 in powering the starter motor 26. Specifically, again referring to FIG. 4, unless key-crank is occurring, the ECU 40 will control the APM 24 to charge the low voltage battery 22 for a predetermined amount of time under step 164. If key-crank is occurring, the ECU 40 will control the APM 24 to provide power in parallel with the low voltage battery 22 to the starter motor 26 under step 162.

In yet another scenario, if the voltage level of the low voltage battery 22 drops below the predetermined value, the method proceeds through steps 102, 104, 106, 108 of FIG. 2a to step 128 of FIG. 2b and, more specifically through steps 160 and 164 of FIG. 4 so that the APM 24 is activated to provide power in parallel with the low voltage battery 22. If this occurs during a tandem start (as described in steps 114, 116, 118 and 120), fueling of the internal combustion engine begins immediately in step 120.

If, in any of the above scenarios, the first start of the engine 12 is still unsuccessful (i.e., if in step 122 of FIG. 2a the ECU 40 determines that the engine start was not successful), the method 100 returns to step 164 of FIG. 4 in which the APM 24 is controlled by the ECU 40 to charge the low voltage battery 22 for a predetermined amount of time during key-up or key-off situations. Additionally, even if the ECU 40 is reset due to low voltage over the bus 30, charging of the low voltage battery 22 in step 164 will remain active for the predetermined amount of time.

While the best modes for carrying out the invention have been described in detail, those familiar with the art to which this invention relates will recognize various alternative designs and embodiments for practicing the invention within the scope of the appended claims.

The invention claimed is:

1. A method of performing a first start of an internal combustion engine of a hybrid electro-mechanical vehicle having a motor/generator powerable by a high voltage battery characterized by a first voltage and a staffer motor for starting the internal combustion engine powerable by a low voltage battery characterized by a second voltage less than the first voltage, the method comprising:
   activating an auxiliary power module prior to the engine starting to thereby direct power stored in the high voltage battery through the auxiliary power module at the second voltage to assist the low voltage battery in powering the starter motor with power at the second voltage; and wherein a controller carrying out said activating is powerable by the low voltage battery at the second voltage.

2. The method of claim 1, wherein said activating comprises charging the low voltage battery with the power directed through the auxiliary power module.

3. The method of claim 2, wherein said charging the low voltage battery occurs for a predetermined amount of time.

4. The method of claim 3, further comprising:
   relaying a signal to attempt key-crank.

5. The method of claim 1, wherein said activating the auxiliary power module comprises providing the power directed through the auxiliary power module directly to the starter motor in parallel with power provided by the low voltage battery.

6. The method of claim 1, further comprising:
   determining whether key-crank has occurred;
   wherein said activating the auxiliary power module comprises charging the low voltage battery with the power directed through the auxiliary power module if key-crank has not occurred and during both key-up and key-off status; and
   wherein said activating the auxiliary power module comprises providing the power directed through the auxiliary power module directly to the starter motor in parallel with power provided by the low voltage battery if key-crank has occurred.

7. The method of claim 1, further comprising:
   prior to said activating the auxiliary power module, monitoring at least one of voltage level of the low voltage battery, temperature of the low voltage battery and temperature of the engine;
   after said monitoring, comparing said at least one of voltage level of the low voltage battery, temperature of the low voltage battery and temperature of the engine with a predetermined voltage level, a first predetermined temperature, and one of said first predetermined temperature and a second predetermined temperature, respectively; and
   wherein said activating the auxiliary power module occurs if said monitored voltage level is less than said predetermined voltage level, said monitored low voltage battery temperature is below said first predetermined temperature or said monitored engine temperature is below said one of said first and said second predetermined temperature.

8. The method of claim 1, further comprising:
   prior to said activating the auxiliary power module, identifying a predetermined series of driver input, wherein said activating is in response to said identifying.

9. A method of performing a first start of an internal combustion engine of a hybrid electro-mechanical vehicle having a motor/generator powerable by a high voltage battery characterized by a first voltage and a staffer motor for starting the internal combustion engine, the staffer motor being powerable by a low voltage battery characterized by a second voltage less than the first voltage, the method comprising:
   monitoring at least one of voltage level of the low voltage battery, temperature of the low voltage battery and temperature of the engine;
   after said monitoring, comparing said at least one of voltage level of the low voltage battery, temperature of the low voltage battery and temperature of the engine with a predetermined voltage level, a first predetermined temperature, and one of said first predetermined temperature and a second predetermined temperature, respectively;
   determining whether key-crank is occurring;
   activating an auxiliary power module to thereby direct power stored in the high-voltage battery through the auxiliary power module at the second voltage to assist the low voltage battery in powering the staffer motor, wherein said activating the auxiliary power module occurs if said monitored voltage level is less than said predetermined voltage level, said monitored low voltage battery temperature is less than said first predetermined temperature or said monitored engine temperature is less than said one of said first and said second predetermined temperature;
   wherein said activating the auxiliary power module comprises charging the low voltage battery with the power directed through the auxiliary power module if key-crank is not occurring even if reset of a controller carrying out said comparing and said activating has occurred; and
   wherein said activating the auxiliary power module comprises providing the power directed through the auxiliary power module directly to the staffer motor in parallel with power provided by the low voltage battery if key-crank is occurring.

10. A method of performing a first start of an internal combustion engine of a hybrid electro-mechanical vehicle having a motor/generator powerable by a high voltage battery characterized by a first voltage and a staffer motor for starting the internal combustion engine, the staffer motor being powerable by a low voltage battery characterized by a second voltage less than the first voltage, the method comprising:
   monitoring at least one of voltage level of the low voltage battery, temperature of the low voltage battery and temperature of the engine;
   after said monitoring, comparing said at least one of voltage level of the low voltage battery, temperature of the low voltage battery and temperature of the engine with a predetermined voltage level, a first predetermined temperature, and one of said first predetermined temperature and said second predetermined temperature, respectively;
   activating an auxiliary power module to thereby direct power stored in the high voltage battery through the auxiliary power module at the second voltage to assist the low voltage battery in powering the staffer motor, wherein said activating the auxiliary power module occurs if said monitored voltage level is less than said predetermined voltage level, said monitored low voltage battery temperature is less than said first predetermined temperature or said monitored engine temperature is less than said one of said first and said second predetermined temperature;

determining whether key-crank has occurred;

wherein said activating the auxiliary power module comprises charging the low voltage battery with the power directed through the auxiliary power module if key-crank has not occurred and during both key-up and key-off status; and wherein said activating the auxiliary power module comprises providing the power directed through the auxiliary power module directly to the starter motor in parallel with power provided by the low voltage battery if key-crank has occurred.

* * * * *